No. 687,903. Patented Dec. 3, 1901.
H. SCHULTZ.
ELECTRICAL HEAT REGULATING APPARATUS.
(Application filed July 29, 1898.)
(No Model.) 2 Sheets—Sheet 1.
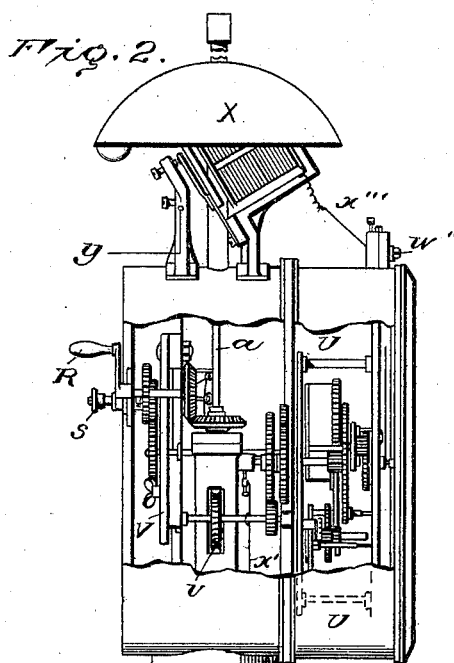
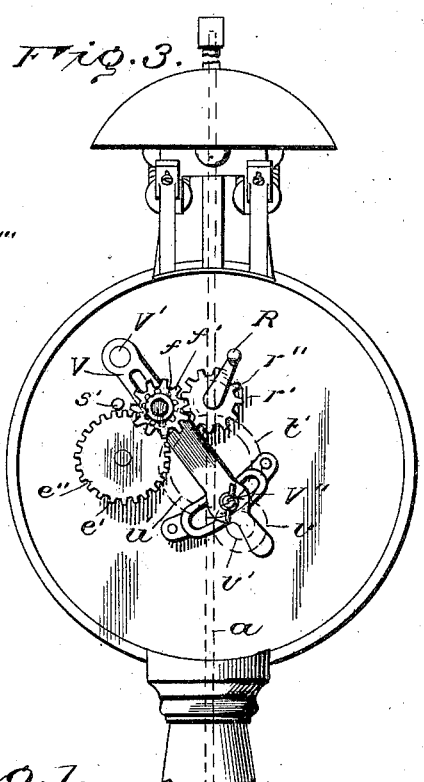
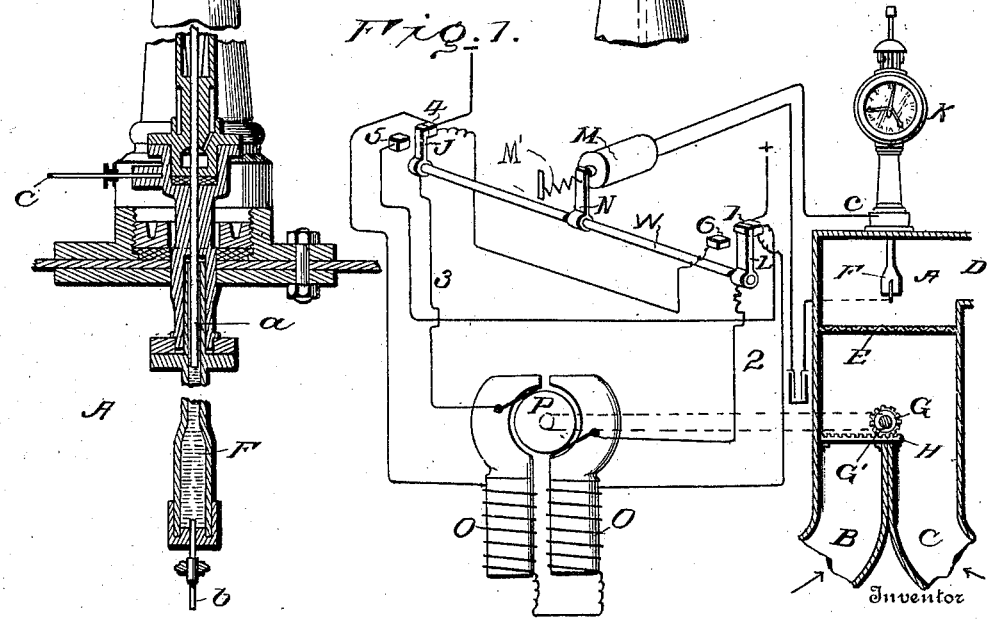
Witnesses
Inventor
Heinrich Schultz,
By Knight Bros
Attorneys

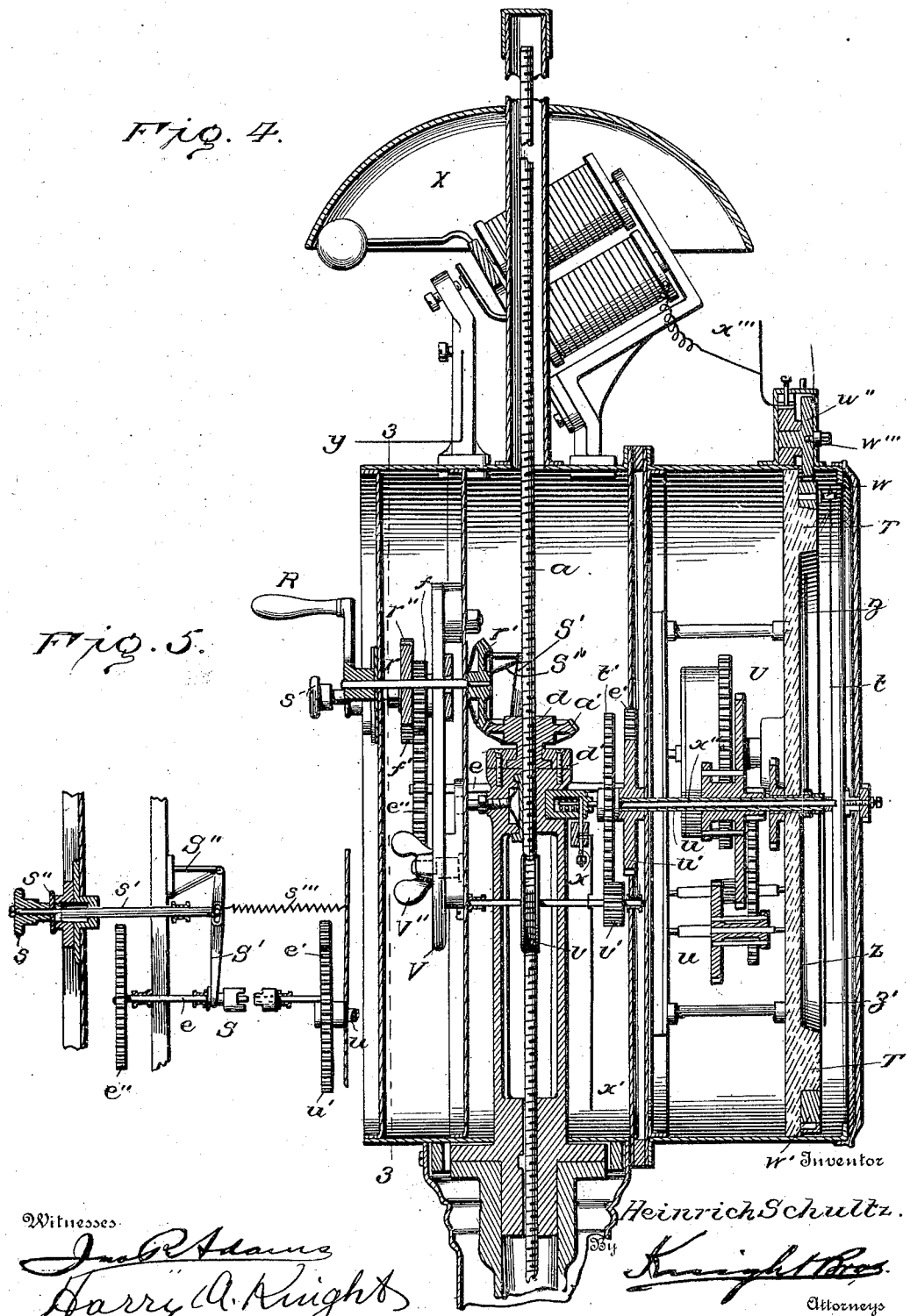

UNITED STATES PATENT OFFICE.

HEINRICH SCHULTZ, OF BERLIN, GERMANY.

ELECTRICAL HEAT-REGULATING APPARATUS.

SPECIFICATION forming part of Letters Patent No. 687,903, dated December 3, 1901.

Application filed July 29, 1898. Serial No. 687,212. (No model.)

*To all whom it may concern:*

Be it known that I, HEINRICH SCHULTZ, a subject of the Emperor of Germany, and a resident of Berlin, in the Kingdom of Prussia and Empire of Germany, have invented certain new and useful Improvements in Electrical Heat-Regulating Apparatus, of which the following is a specification.

In many branches of manufacture dealing with chemistry—such, for instance, as sugar production, malting, beer-brewing, dextrine manufacture, &c.—and also in many special cases of heating and drying in which accurate physical conditions are essential the accomplishment of the ends aimed at make it necessary that not only the initial and ultimate temperatures of the gaseous or liquid bodies be of definite degrees, but also that intermediate temperatures shall be maintained or changed strictly in accordance with rules arising or laid down from practical experience and logical consideration. In order to obtain this, it has heretofore been necessary to depend entirely upon the personal care and intelligence of the attendant.

In the accompanying drawings and following description is presented an apparatus which after being set up by the careful hand of the manufacturer for a special purpose thereafter regulates automatically the admission of heat or the regulation or loss of the heat in strict accordance with the degree and time of temperature to be maintained or changes in temperature to be effected.

In said drawings, Figure 1 is a diagrammatic view and an apparatus in combination therewith, partly in section, showing an electrically-operated gate for regulating the entrance and mixing of warm and cold air, water, &c.
Fig. 2 is a side elevation, partly in section, of the essential part of the regulating apparatus, consisting of a thermometric circuit-closer in the lower part of the figure and a measurer of time in the upper part thereof.
Fig. 3 is a rear elevation of the upper part of that shown in Fig. 2. Fig. 4 is a vertical section, in greater detail, of the inner construction of the upper part of the apparatus shown in Fig. 2. Fig. 5 is a detail view of the mechanism shown in Figs. 2 and 4.

A is a mixing-chamber, and B and C passages of an apparatus for mixing warm fluid (air, water, or the like) entering at B with cold fluid (air, water, or the like) entering at C. When both fluids have reached the mixing-chamber A through the screen E, the temperature of the mixture is transmitted through the thermometer F to the regulating apparatus K, located above. The mixed fluid is led off at an exit D to its destination or place of use.

G is a gear-wheel fastened on a revolving shaft G' and meshes with the upper toothed surface of a regulating-gate H. When the gear-wheel G is turned, the passage B for the warm liquid is opened and the passage C for the cold is closed, or vice versa.

A small and very light rock-shaft W, rotatable upon its longitudinal axis, has on opposite ends contact-pieces L and J and can be so turned that these contacts will rest at one time against terminals 1 and 4 and at another time against terminals 5 and 6. The oscillating movement of the shaft W is accomplished in one direction by a magnetic coil M, which at a given moment is magnetized by the current from a battery Q and attracts the iron core fastened on a rod N, while said shaft W is turned in the opposite direction by a suitable spring M'.

P is a commutator, and O represents field-coils, of a motor. The current going from + (positive) contact 1 to − (negative) contact 4 takes for its path the circuit-contact 1, field-coils O, and contact 4. The main circuit goes crosswise or alternately at one time from contact 1, contact-piece L, over a conductor 2, commutator P, conductor 3, to contact-piece J, and contact 4. The other time—that is, when the rod W has been so turned that the contacts 5 and 6 are contacted by contact-piece J and contact-piece L—the main circuit takes the course contact 1, contact 5, contact-piece J, conductor 3, commutator P, conductor 2, contact-piece L, contact 6, and contact 4. It is seen that the current, according to the position of the contact-pieces J and L, runs through the commutator P first in one direction and then in the opposite direction, and thereby imparts to the shaft first a right-hand movement and then a left-hand movement.

As already stated, Fig. 1 is partly a diagrammatic view; but it will be understood that when the commutator P and the gear-wheel G are regarded as being on the one and the same shaft G' to move the regulating-gate H back and forth by means of the gear-wheel G it is only necessary to make and break the circuit-battery Q, magnetic coil M, thermometer F, and battery Q. This will be understood upon reference to Fig. 1.

The regulating apparatus K and thermometer F are shown enlarged in Figs. 2, 3, and 4.

F is a quicksilver thermometer projecting into the mixing-chamber A. The lower end of the regulating-rod $a$ is placed above but very near to the surface of the quicksilver in the thermometer. On one side is the regulating-rod $a$ and a metallic connection $c$, and on the other side is the thermometer F and a metallic connection $b$. The metallic connections $c$ and $b$ form the terminals of the circuit, which consists of thermometer F, battery Q, magnetic coil M, and thermometer F, as seen in Fig. 1. The circuit is closed when the surface of the quicksilver F comes into contact with the regulating-rod $a$, having thus ascended as a result of rising temperature in the mixing-chamber A. If, however, the temperature of the mixing-chamber A falls or if from any other reason the contact ceases, the circuit will be again broken. Now the regulating-rod $a$ is so adjustable in its position that the circuit in the thermometer F, battery Q, magnetic coil N, and thermometer F may be made at very different temperatures. The adjusting of the regulating-rod may be done either by hand through a crank R, Figs. 2 and 4, or automatically through time-measurer U. The crank R is fastened on the outer end of a shaft $r$, which has on its inner end a bevel gear-wheel $r'$, Fig. 4. The latter meshes in a corresponding bevel gear-wheel $a'$. The regulating-rod $a$ is provided with a worm and enters into the revolving worm-sleeve $d$, secured to a housing $d'$. The bevel-gear $a'$ and worm-sleeve $d$ are secured together, so that if the crank R is turned the regulator-rod $a$ will rise or sink.

The time-measurer U is a clockwork. The dial Z as well as the hour-hand $z$ and minute-hand $z'$ are incidental parts that are not of essential significance for the purpose of the apparatus. On the hollow shaft $u$ of the minute-hand is the gear-wheel $u'$, which drives the gear-wheel $e'$, which lies behind it and is on the same shaft $e$ with the gear-wheel $e''$. The gear-wheel $e''$ drives the gear-wheel $f$ and turns on the same axis with the gear-wheel $f'$. The gear-wheel $f'$ finally drives the gear-wheel $r''$, which is fastened on the hand-manipulated shaft $r$, already mentioned. It has been explained that the regulating-rod $a$ can be raised and lowered by means of bevel gear-wheels $r'$ and $a'$ and the worm-sleeve.

If it is desired to work the regulating-rod $a$ by means of the crank R quicker than the clockwork U can go, then the connection with the clockwork must first be broken. The mechanism shown in Fig. 5 serves for this purpose; but in order that the clearness of the drawing might not be affected it is not completely illustrated in Fig. 4. The shaft $e$ is therefore divided and is only united by a clutch or coupling S when the clockwork U is to be brought into operation. A clutch-lever S', which is pivoted on a block S''', is operated by a handle $s$ through means of a push-rod $s'$. A pin $s''$ serves for fastening the clutching mechanism in the position shown in Fig. 5. If the pin $s''$ be removed, a draw-spring $s'''$ pulls the outer member of the clutch or coupling S back into place.

The degree of temperature at which the electric contact occurs between the regulating-rod $a$ and the surface of the quicksilver of the thermometer can be ascertained either from a scale graduated on $a$ itself, or the following construction may be used, which shows the degree of temperature on a dial T by means of a pointer $t$. In the hollow minute-hand shaft $u$ is arranged a temperature-pointer shaft X'', on the outer end of which is a pointer $t$ and on the inner end a gear-wheel $t'$. The latter is driven by the small gear-wheel $v'$, which is fixed on the same shaft with a gear-wheel $v$, having teeth on its circumference arranged in such manner that it meshes with the worm on the regulating-rod $a$. It is evident that when the regulating-rod $a$ is moved either up or down the pointer $t$ on the circular scale T shows the temperature at which $a$ makes contact with the quicksilver.

A further improvement in the described mechanism exists in an alarm-bell X, which rings at the moment of reaching a certain degree of temperature in the mixing-chamber A, Figs. 2 and 4, above which a further change is to be avoided. For this purpose a contact-wire $w$ is provided, through which a circuit is established by connection with the temperature-indicator $t$, which circuit operates the electric alarm X, the mechanism of which is known. The operation of the bell is as follows: The contact-wire $w$ is fastened on a ring $w'$, which has gearing and meshes with a small gear-wheel $w''$. As the latter is adjusted by means of a hub $w'''$, the contact-wire $w$ may be placed on any desired part of the scale T. If the regulating-rod $a$ has risen so high or fallen so low that the pointer $t$ contacts with wire $w$, a circuit is made, the battery of which is not shown in the drawings, because unimportant, and the current traverses conductor $x'$, a binding-post $x$, pointer-shaft $x''$, pointer $t$, contact-wire $w$, gear-wheel $w''$, conductor $x'''$, bell X, conductor $y$, and the bell X rings.

It has already been shown in the introduction what significance that time has in which the described apparatus shall govern the transition from the initial to the final temperature. In order to adjust the apparatus for any given length of time and to insure that the regulating-rod $a$ shall accomplish within the given time—say an hour—a smaller or greater distance, the two gear-wheels $f$ and $f'$, fastened on a common axis, Fig. 3, are changeable. For this compare Fig. 3. In order to be able to adjust the gear-wheels $f$ and $f'$ as widely as possible, their axis is adjustable in a slot in an arm V, which latter may be pivoted to a hinge-bolt V' and may be clamped by means of a thumb-screw V''.

In order to describe the use and method of operation of the described heat-regulator, the following example is chosen: For a certain technical purpose it is necessary to raise the temperature in the mixing-chamber A, Fig. 1, from the initial temperature of 10° to the ultimate temperature of 118° and within nine hours. For this purpose there has to be arranged a certain pair of gear-wheels $f\ f'$, Figs. 3 and 4, which will make a progress of 12° of the temperature-indicator $t$ inside of one hour, or 1° in five minutes. The shaft-coupling S is pulled out by means of the handle $s$, Fig. 5, and the crank R turned until the pointer $t$ reaches the initial temperature of 10°. Further, the ring $w'$ is carried so far around by means of a key applied to the hub $w'''$ and gear-wheel $w''$, Fig. 4, that the contact-wire $w$ reaches the final temperature of 118°. The apparatus is left in this condition until the desired initial temperature of 10° has been safely reached in the chamber to which the channel D, Fig. 1, leads—that is, in the particular process-chamber where the process is to be carried on. Then for the first time the coupling $s$, Fig. 5, is made, and from this moment the heat-regulating apparatus remains subject to the sole power of the indicated time. From now on the regulating-rod $a$ rises, driven by the clockwork U, exactly according to the speed prescribed by the gear-wheels $f\ f'$, and the column of mercury is forced by the heat entering passage B, Fig. 1, to follow this motion. After nine hours the temperature-pointer $t$ contacts at last with the wire $w$, and the bell $x$ warns the workman that the end of the process has been reached, and he looses the couplings S, Fig. 5.

Having thus described my invention, the following is what I claim as new therein and desire to secure by Letters Patent:

1. In an electrical heat-regulating device, the combination of a heat-controlling valve, an electric motor operating said valve, an electric motor-circuit controlling said motor, a reversing-switch controlling said motor-circuit, a switch-circuit, a thermostatic medium in said switch-circuit, a sliding contact-rod also in said switch-circuit and in the path of the thermostatic medium, and a clockwork continuously moving said contact-rod relatively to said expanding medium whereby a gradually-changing temperature develops.

2. In an electrical heat-regulating device, the combination of a heat-controlling valve, an electric motor operating said valve, an electric motor-circuit controlling said motor, a reversing-switch controlling said motor-circuit, a switch-circuit, a thermostatic medium in said switch-circuit, a sliding contact-rod also in said switch-circuit and in the path of the thermostatic medium, a feed-nut threaded on said contact-rod, and a clockwork rotating said feed-nut and thereby continuously moving said contact-rod relatively to said expanding medium whereby a gradually-changing temperature develops.

3. In an electrical heat-regulating device the combination of a heat-controlling motor a thermometric circuit-closer in circuit with said motor a clockwork moving a contact of said circuit-closer relatively to the expanding medium of the thermometer whereby the temperature at which the circuit-closer acts is progressively varied, and an adjustable alarm indicating when a given time of action of the clockwork has transpired.

4. In combination with a thermometric circuit-closer, a clockwork and interchangeable driving connections between the clockwork and the contact of said circuit-closer whereby the distance said contact is moved in a given time may be prearranged.

5. In combination with a thermometric circuit-closer, having a movable contact, a clockwork, changeable driving connections between the clockwork and movable contact and an alarm for said clockwork indicating the lapse of a previously-determined time.

6. In a thermometric heat-regulating device, the combination of the thermometric circuit-closer having a movable contact, a mechanism having connections with said movable contact through which it imparts a progressive movement thereto, a setting device for adjusting the position of the movable contact relatively to the mechanism which moves it and means for making and breaking the driving connection between the moving mechanism and the moving contact.

7. In a thermometric heat-regulator the combination of the thermometric circuit-closer having a movable contact, a clockwork having connections through which it moves said contact, an alarm for indicating the arrival of the clock mechanism at a given point in its movement and a circuit for actuating said alarm including an indicator-hand of the clockwork and a contact for said hand arranged upon an adjustable ring concentric with the path of said hand.

8. An electrical heat-regulating apparatus comprising inlet-passages, a valve controlling the inlet-passages, a mixing-chamber having an exit and with which the inlet-passages communicate, a thermometer connected with the mixing-chamber having a mercurial column and a regulating-rod located over the mercurial column, metallic connections communicating respectively with the mercurial column and with the regulating-rod, a motor connected with the controlling-valve, an electrical device whereby the motor is operated when the mercurial column and the regulating-rod contact and when they separate, and a clock mechanism for automatically raising the regulating-rod; substantially as described.

9. An electrical heat-regulating apparatus comprising inlet-passages, a valve controlling the inlet-passages, a mixing-chamber having an exit and with which the inlet-passages communicate, a thermometer connected with the mixing-chamber having a mercurial column, and a regulating-rod located over the mercurial column, metallic connections communicating respectively with the mercurial column and with the regulating-rod, a motor connected with the controlling-valve, an electrical device whereby the motor is operated when the mercurial column and the regulating-rod contact and when they separate, and a clock mechanism for automatically raising the regulating-rod having adjustable gear-wheels; substantially as described.

The foregoing specification signed at Chemnitz, Saxony, this 14th day of July, 1898.

HEINRICH SCHULTZ.

In presence of—
KARL OTTO ZIMMERMANN,
BERNHARD BLANK.